United States Patent
Broomhall et al.

(10) Patent No.: US 9,880,737 B2
(45) Date of Patent: Jan. 30, 2018

(54) CHANGING KEYBOARD LAYOUT AUTOMATICALLY WHILE ENTERING A PASSWORD

(71) Applicant: International Business Machines Corporation, Armonk, NY (US)

(72) Inventors: Matthew E. Broomhall, Goffstown, NH (US); Fabrizio Nascimento Caldas, Sumaré (BR); Christopher R. Dotson, Lexington, KY (US); Li Kong, Beijing (CN); Jia Tao Li, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 388 days.

(21) Appl. No.: 14/788,257

(22) Filed: Jun. 30, 2015

(65) Prior Publication Data

US 2017/0003871 A1    Jan. 5, 2017

(51) Int. Cl.
*G06F 3/0488* (2013.01)
*G06F 21/36* (2013.01)

(52) U.S. Cl.
CPC .......... *G06F 3/04886* (2013.01); *G06F 21/36* (2013.01)

(58) Field of Classification Search
CPC ............................. G06F 3/04886; G06F 21/36
See application file for complete search history.

(56) References Cited

U.S. PATENT DOCUMENTS

| 4,688,020 | A   | 8/1987 | Kuehneman et al. |
| 7,705,829 | B1* | 4/2010 | Plotnikov ............. G06F 3/0236 341/22 |
| 2008/0184036 | A1  | 7/2008 | Kavsan |
| 2009/0106827 | A1* | 4/2009 | Cerruti ................... G06F 21/31 726/7 |
| 2010/0060585 | A1* | 3/2010 | Chiu ................... G06F 3/04886 345/168 |

(Continued)

FOREIGN PATENT DOCUMENTS

WO    WO 2014/067321 A1    5/2014

OTHER PUBLICATIONS

English Translation WO 2014/067321 A1.

*Primary Examiner* — Alvin Tan
(74) *Attorney, Agent, or Firm* — Scully, Scott, Murphy & Presser, P.C.; Kurt P. Goudy, Esq.

(57) ABSTRACT

A system and method for automatically reconfiguring a keyboard layout display to facilitate entry of password characters. The system analyzes the password while setting it, and will save a required keyboard layout for each character. A method includes obtaining an encoded sequence of keyboard layouts mapped to a corresponding characters sequence of a user password, receiving input of a password character and determining whether the character input is correct. If the character entered is correct: decoding the keyboard layout sequence to obtain a correct keyboard layout associated with a next password character to be entered; and automatically displaying the correct keyboard layout associated with a next character to be entered; or if the character entered is not correct: decoding the keyboard layout sequence to obtain one of: a correct or incorrect keyboard layout associated with a next password character to be entered; and automatically displaying the correct or incorrect keyboard layout on the device.

20 Claims, 5 Drawing Sheets

(56) References Cited

U.S. PATENT DOCUMENTS

| | | | | |
|---|---|---|---|---|
| 2013/0091583 A1* | 4/2013 | Karroumi | ............ | G06F 3/0236 726/26 |
| 2014/0098141 A1* | 4/2014 | Sen | .................... | G06F 3/04886 345/660 |
| 2015/0309724 A1* | 10/2015 | Wu | .................... | G06F 3/04886 715/773 |
| 2015/0347733 A1* | 12/2015 | Tsou | ....................... | G06F 3/013 726/18 |

* cited by examiner

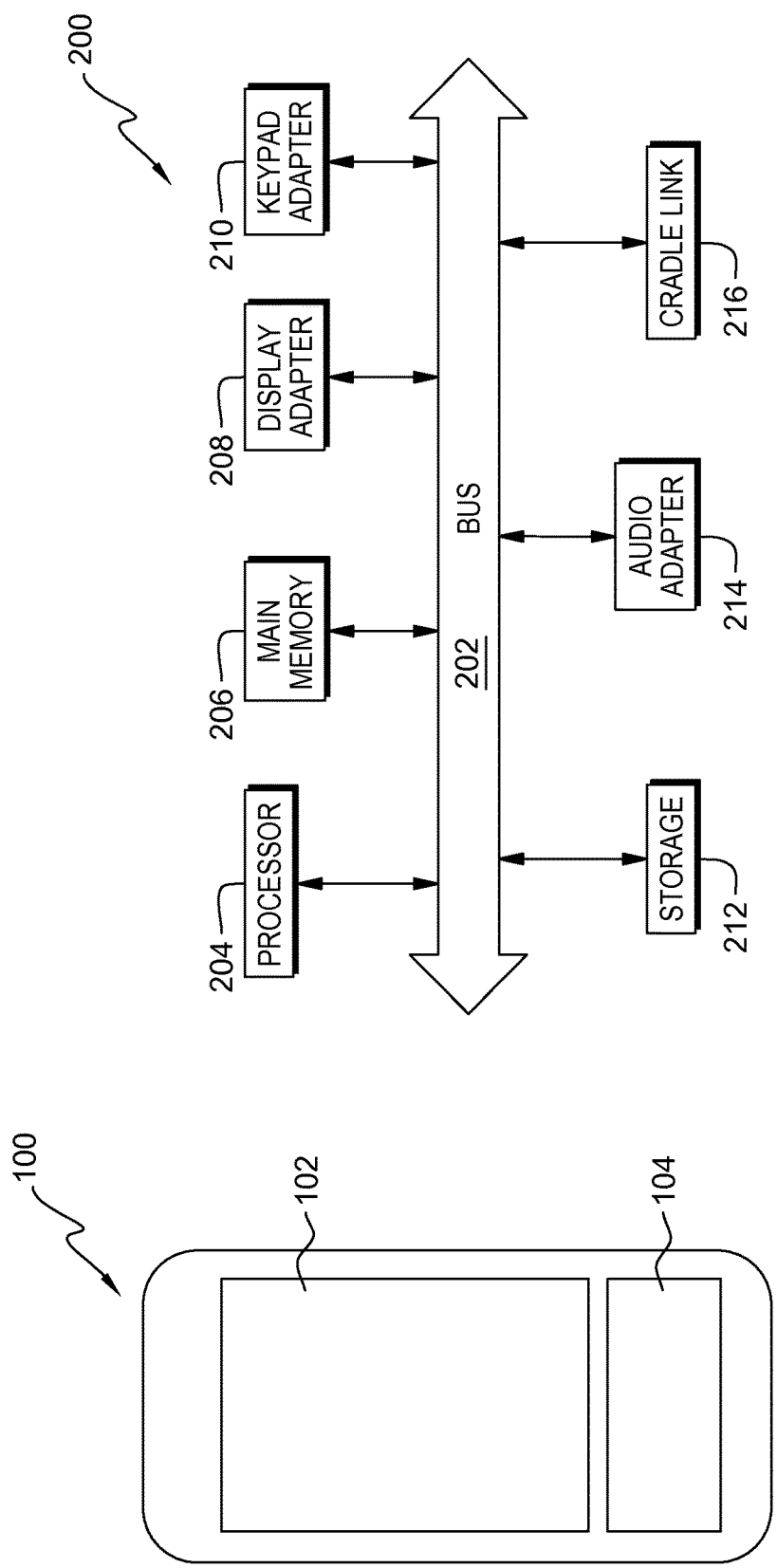

CHANGING KEYBOARD LAYOUT AUTOMATICALLY WHILE ENTERING A PASSWORD

BACKGROUND

The present invention relates generally to computer security and password protection, and more particularly, relates to a reconfigurable electronic keyboard for use with desktop computer systems, mobile smartphones, and like devices, and a method to change the keyboard layout automatically of such a keyboard while entering a password.

In some desktop and mobile computer systems and like devices, e.g., a smartphone or tablet keyboard, it is often that users need to manually enter their password via a keyboard interface provided by the device—at least initially to access the device functionality in the first instance. Oftentimes, it may be inconvenient for users to enter a complex password because the keyboard cannot display the full character set at the same time. For example, on some devices, for a user to enter a complex password on a keyboard, e.g., a password "Qw3ErT4&", the user needs to change the keyboard layout seven times to input the password character string, e.g., by selecting a shift key (or not) to alternate between the keyboard layout having upper case characters, lower case characters, and numbers as this example password "Qw3ErT4&" would require.

It would be desirable to provide a method and system that enables the keyboard layout to change automatically while a user enters the password character sequence via a soft keyboard interface.

BRIEF SUMMARY

In an aspect of the present invention, a method for automatically reconfiguring a keyboard layout is provided.

In one particular aspect, there is provided a method to predetermine the keyboard layout on a smartphone or tablet while inputting a password.

Thus, in one aspect, there is provided a method to automatically change a keyboard layout of a device while a user enters a password. The method comprises: obtaining an encoded sequence of keyboard layouts mapped to a corresponding sequence of characters of a user password; and a) receiving input of a character of the user password; and b) determining whether the character input is correct, and if the character entered is correct: decoding the mapped keyboard layout sequence to obtain a correct keyboard layout associated with a next character to be entered for the password; and automatically displaying the correct keyboard layout associated with a next character to be entered on the device. Otherwise, if the character entered is not correct: decoding the mapped keyboard layout sequence to obtain one of: a correct or incorrect keyboard layout associated with a next character to be entered for the password; and automatically displaying the correct or incorrect keyboard layout on the device.

Further to this aspect, the input character entered is the first character of the user password, and the method further comprises: repeating each of steps a)-b) until all successive characters of the user password are correctly entered.

In another aspect, there is provided a system for automatically changing a keyboard layout of a device while a user enters a password. The system comprises: a memory storage device; and a hardware processor, coupled to the memory storage device, the processor configured to: obtain an encoded sequence of keyboard layouts mapped to a corresponding sequence of characters of a user password; and a) receive input of a character of the user password; and b) determine whether the character input is correct, and if the character entered is correct: decode the mapped keyboard layout sequence to obtain a correct keyboard layout associated with a next character to be entered for the password; and automatically display on the device the correct keyboard layout associated with a next character to be entered; or if the character entered is not correct: decode the mapped keyboard layout sequence to obtain one of: a correct or incorrect keyboard layout associated with a next character to be entered for the password; and automatically display on the device the correct or incorrect keyboard layout.

In a further aspect, there is provided a computer program product for performing operations. The computer program product includes a storage medium readable by a processing circuit and storing instructions run by the processing circuit for running a method. The method is the same as listed above.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 4 is a illustrative depiction of a mobile device in which the present invention is employed;

FIG. 5 depicts an exemplary hardware configuration of the device of FIG. 4. for performing methods described herein in one non-limiting embodiment.

DETAILED DESCRIPTION

The present invention is directed to a system and method for automatically changing (re-configuring) a keyboard display screen layout upon each successful entry of a character of that user's user password.

Figure 1A:
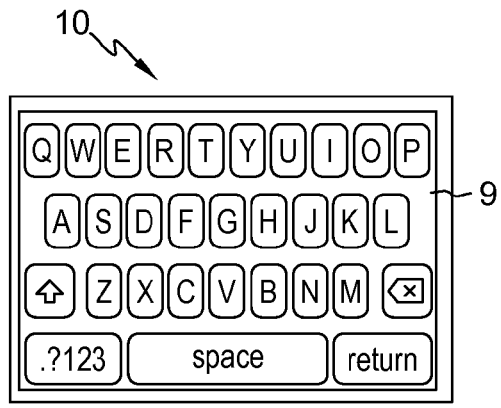
FIGS. 1A-1C show three different keyboard layout types, in one embodiment, that can be generated on the display of a digital mobile phone device.
Figure 1B:
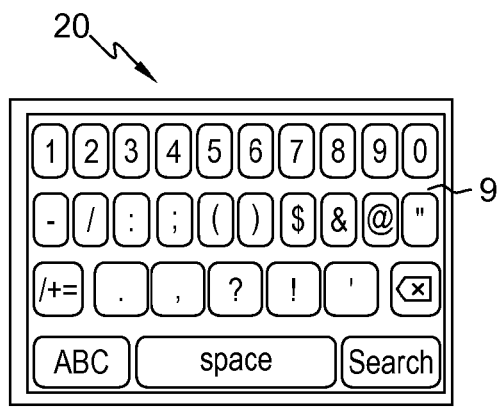
Figure 1C:
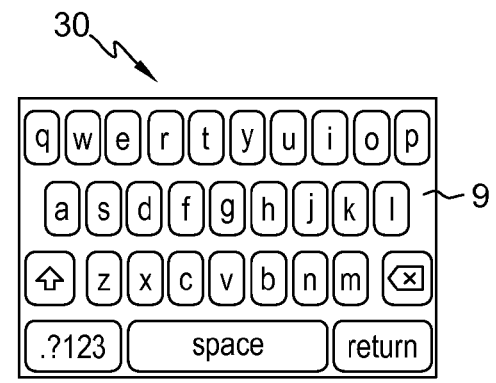

FIGS. 1A-1C show three different example keyboard layout types, in one illustrative embodiment, that can be generated on the display area 9 of a digital communications device. Such a device may include, but are not limited to: a smartphone, iPhone, a tablet device or any like device that has capability to display having a soft keyboard, e.g., for various purposes such as device entry, application entry, etc., where display space is limited.

Each of the example displays 9 of FIGS. 1A-1C may comprise a touch-sensitive input screen in a designated area within the device display region, and is generated by the device in known manner. In one embodiment, the designated touch screen display area 9 can be located at a fixed location (e.g., a bottom) of the display, and can have text, color, icons, or the like, or a combination thereof, designating the keyboard display area, in the manner as known. As shown in FIG. 1A, a first example keyboard layout display 10 is depicted as a CAP letter QWERTY type layout. In FIG. 1B, a second example keyboard layout display 20 shows a numeric character type layout, and in FIG. 1C, a third example keyboard layout display 30 is of a small letter QWERTY type layout. The example keyboard layouts 10, 20, and 30 are shown for non-limiting, illustrative purposes and other types of virtual keyboard display layouts can be generated for all possible languages, symbols, characters, etc. that can be displayed on a mobile device, such as mobile device 100 of FIG. 4.

In one embodiment, the present disclosure provides a method to predetermine the keyboard layout on a smartphone or tablet while inputting a password. A mechanism is built into the device that stores in a memory a "hint" sequence having characters representing a sequence of keyboard layouts associated with a respective sequence of characters of a user password for a particular application that requires a password entry to activate. Multiple hint sequences may be provided and stored in the device, one associated for each application that requires a password entry to activate. The length and character type (e.g., numbers, letters and symbols) of a user password is not restricted.

In an embodiment, a hint is a sequence of characters, e.g., a plurality of numbers, representing a sequence of keyboard layouts in one-to-one correspondence with a respective sequence of characters of the password to be entered. For example, associating a sequence of keyboard layouts 10, 20 and 30 shown in FIG. 1 may generate a hint as a corresponding sequence of numbers 1, 2 and 3 with hint character "1" corresponding to a keyboard layout 10 of FIG. 1A associated with entry of the first password character, hint character "2" corresponding to a keyboard layout 20 of FIG. 1B associated with entry of the second password character, and hint character "3" corresponding to a keyboard layout 30 of FIG. 1C, associated with entry of the third password character, etc.

It is understood that the hint sequence of characters may be stored in a memory storage unit within the device as the actual display sequence (e.g., "13213122") or, for greater security, the sequence may be encoded using a hash or encryption of the actual display sequence. The hash is a per password hash, with each password potentially having a different hash for a respective application requiring password entry to activate. In one embodiment, the hint sequence for keyboard layouts is stored in a fashion that depends upon the correct entries being entered. For example, the method may include encoding a sequence 13213122, and in operation, each character of the sequence is decoded by applying logic, e.g., XORing the corresponding encoded character of the hint sequence with the corresponding password character entered. In one embodiment, the stored hint sequence is a function of the correct password, and may be encrypted using each character of the actual correct password as it is entered. In this manner, unless the user enters the correct password characters, the correct keyboard layouts may not be presented for the subsequent characters.

Thus, in operation, use of this hint sequence of screen displays associated with a respective password characters will cause generating and automatic switching of the keyboard layout appropriate for the next successive password character to be entered. For example, responsive to successful entry of a first character of the password sequence, the next character of the hint sequence will cause the device to display the keyboard suitable for the next character of the password to be entered. For example, given the example keyboard displays 10, 20 and 30 of FIG. 1, associated hint values may be 1, 2 and 3 respectively. Thus, given an example user password of "Qw3ErT4&", using the convention of corresponding displays of FIG. 1, the system will automatically generate a hint sequence (or an obfuscation thereof) in this example a sequence of "13213122" for the keyboard layouts after analyzing the password and the hint (sequence of displays).

In one embodiment, each application initiated (detected) will provide an initial "hint" such that the first keyboard layout will automatically be generated for the user and start the user out at with the correct screen layout for receiving user entry of the first password character. However, preferably, the initial keyboard layout for the first password character to be entered is to be displayed manually, and the remainder keyboard layouts displayed in accordance with the hint sequence.

Initially, within the device, a password field is stored and populated with a "hint" such that a correct order of keyboard layouts will be presented on the device display to the user upon successive entry of the correct password characters. As will be described, the keyboard layout is automatically updated on a per character basis, as long as an immediate prior password character has been correctly entered. That is, a "next" displayed correct keyboard layout could not be determined until the immediately "prior" character of the password is entered correctly, to avoid making brute force attacks easier.

For the example hint sequence "13213122" for the sequence of keyboard layouts, while an attacker may be able to see that the first keyboard layout is "1", the value for the second keyboard layout depends both upon the first password character entered as well as the corresponding mapped entry in the database.

Given an embodiment in which the initial keyboard layout for the first password character to be entered is to be displayed manually, the initial (first) keyboard display (corresponding to the first password character to be entered) is disabled requiring the user to navigate the display to the correct keyboard layout prior to entering the first password character. Disabling the first "hint" sequence character and requiring the user to initially set the first keyboard layout may reduce the risk that an attacker can figure out and know that the first password character is of a particular type, e.g., upper case, lower case, numeric, symbol, etc. of a first keyboard layout. Then, responsive to the first correct password character entry, the device will then automatically switch the display to present the next keyboard layout associated with the next password character to be entered as indicated in the hint. This is repeated until all password characters have been successfully entered.

Thus, when activating an application or device, the device processor will receive a hint associated with the corresponding password to be entered that includes the hint sequence of characters and initiate generation of the keyboard layout corresponding to the first password character to be entered. For an example password character sequence having a corresponding keyboard layout sequence that includes 2, 1, 3, etc., the device will interpret the first character of the hint sequence, and initiate a first display of the first corresponding keyboard layout 20 (FIG. 1B). A next keyboard layout 10 (FIG. 1A) will be displayed responsive to a successful entry of the first password character of that respective password character sequence entered by a user; and the next keyboard layout 30 (FIG. 1C) will be displayed responsive to a successful entry of the second password character of that respective password character sequence entered by a user, and so on.

It is understood that, by using the hint sequence to automatically control a keyboard layout sequence, a user could immediately know that prior character entered is wrong if the next keyboard layout displayed (responsive to that prior character entered) is not a correct keyboard layout for the next successive character to be entered. This provides a superior user experience, because a user may avoid the effort of entering additional characters when the password will not be accepted.

Figure 2:
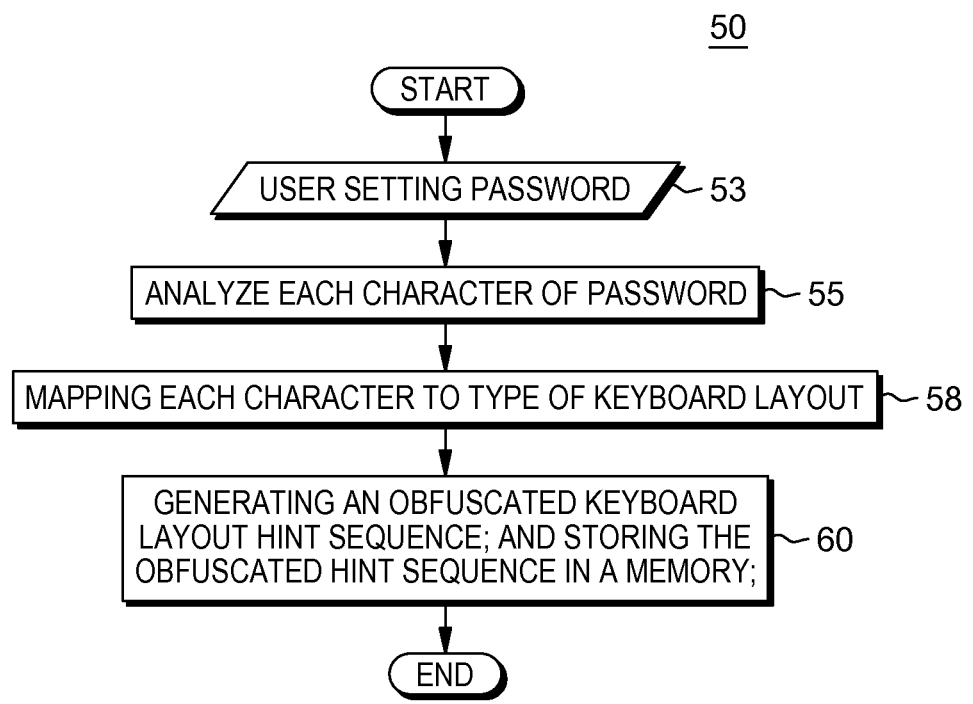
FIG. 2 shows a method 50 including general processing steps of obtaining a hint sequence corresponding to a user application password.

FIG. 2 depicts a method 50 according to one embodiment of the present disclosure that includes the general steps of setting the "hint" sequence corresponding to the user password so that the keyboard display screen layout may be automatically changed (re-configured) upon each entry of a character of that user's application password.

The method 50 of FIG. 2 initially requires entry, e.g., a setting (or re-setting) of the user's password, in the first instance, in a manner typically enabled by a device or application for enabling or authorizing the user's entry into or use of the device, an application, or to change a device setting, for example. As shown in FIG. 2, a first step includes at 53 receiving a series of characters comprising the user's password. The characters are a sequence of user selected characters, symbols, alphanumeric characters, large/small in any combination entered, for example, via the various layouts of FIGS. 1A-1C. As part of this step, the password is stored in a device memory location, e.g., a main memory, or a database, for access by the various applications when authorizing an access. Concurrent with the time of a character's entry, or after all the characters have been entered, at 55, the system notes the entered character and analyzes each character in the sequence to determine a type of keyboard layout associated with the entered character, and at 58, map that character to the associated layout. For example, if the password is "Qw3ErT4&", the system will map this sequence for the keyboard layout after analyzing the password and generate a corresponding hint sequence "13213122" (using the keyboard layouts of FIG. 1A-1C).

Continuing to step 60, the method further performs generating an obfuscated keyboard layout hint sequence in the memory. This employs an encoding, e.g., via applying an encryption or a hash function to the sequence that is based on the correct password that ensures if the hint sequence is compromised or stolen, the actual password will not be easily recovered. For example, if the password were aB^dE$, then the system would calculate the actual keyboard hint of 23123 when the password is initially entered (e.g. the first character's keyboard hint is not stored; the user must manually change to the correct keyboard layout to start). The method performs storing a sequence of numbers that, when combined with the password characters as they are entered, will produce the hint. When the "a" character is entered, it is desired to obtain a layout corresponding to 2; when aB is entered, it is desired to obtain a layout corresponding to 3; when ab^ is entered, it is desired to obtain a layout corresponding to 1, and so forth. One way to do this includes using a one way hash function on the first character and then adding the first keyboard hint (2), then a one-way hash of the first and second characters and adding the next keyboard hint (3), and so forth to produce an obfuscated hint. When each character of the correct password is entered, it will produce the keyboard hint for the next character; if the incorrect password is entered, the keyboard may or may not be correct, but the resulting obfuscated hint cannot easily be used to derive the password. Cryptographic 'salt' and other techniques may be used to ensure that the keyboard hint cannot be used to attack the password more easily than the stored password hash.

Preferably, this value will be saved in an obfuscated form along with the password. For example, as mentioned, the mapping may include the aforementioned encoding of each user password character to obtain the associated (encoded) hint sequence.

Figure 3:
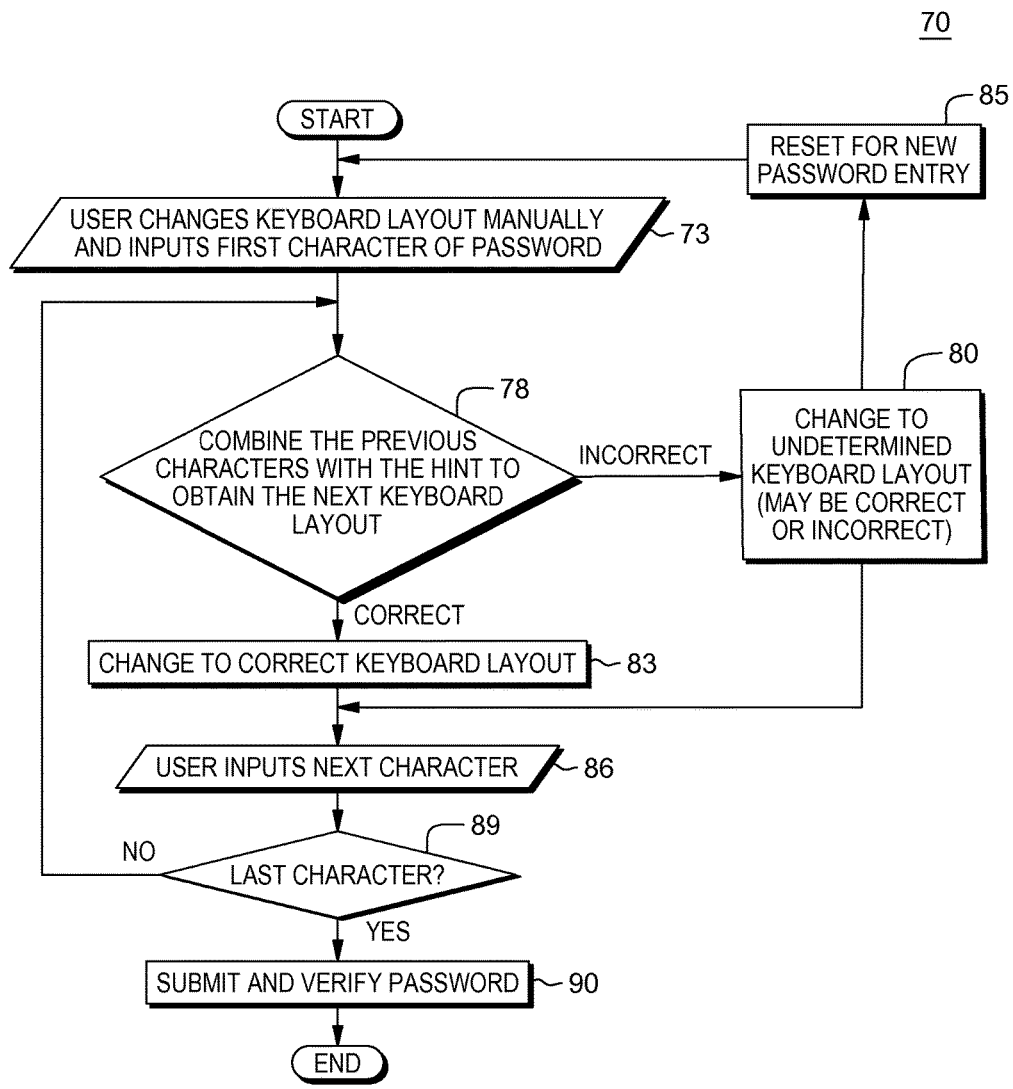
FIG. 3 shows a method for changing (re-configuring) a keyboard display screen layout upon each entry of a character of that user's user password according to one embodiment.

FIG. 3 shows a method 70 for changing (re-configuring) a keyboard display screen layout upon each entry of a character of that user's user password according to one embodiment. This method 70 is an iterative loop that ensures the correct entry of each character in the password sequence. In one embodiment, FIG. 3 shows an example processing that reflects that the user entered password is not validated one character at a time—rather, the characters input are just used to determine the next keyboard layout to be displayed, so that if a user types an incorrect character that user may or may not get the correct layout displayed. If the user actually knows the correct password, this will give the user an early warning that that user has made an error entering the password, and that the user can start the password entry over again. Thus, at a first step 73, in order to unlock a device or application, the user will be prompted to enter a password, and initially, manually navigates to the correct keyboard display associated with the first character of the password to be entered and inputs the first character of the password. It is understood that the device processor will obtain the hint sequence from the memory storage location or database.

Then, at 78, the entered character is combined with the hint to obtain the next keyboard layout. Thus, as determined at 78, if the first character of the password has been successfully input, the system calculates the correct keyboard hint and changes the display to the correct keyboard layout for the next character as indicated at 83. Then the user will be able to enter the next character of the password at 86. However, at 78, if an incorrect character was entered, the system calculates a different keyboard hint, which may or may not be correct, and will display a keyboard layout that may or may not be correct as indicated at step 80. Because the calculation depends on all previous characters entered, it is very likely that an incorrect keyboard will be displayed within several keystrokes of entering an incorrect character.

In one embodiment, it is conceivable that a user may not realize that the next keyboard displayed at step 80 is incorrect, and may continue to step 86 where the next password character input is entered by and received from the user via the display having the incorrect changed keyboard layout.

Otherwise, responsive to the next keyboard displayed at step 80 being an incorrect keyboard display layout for the next character, a user may realize that the prior password character was incorrectly entered, and rather than submitting a next character at 86, may initiate a password entry reset at 85, and return to step 73 to initiate the password entry process again and change the keyboard layout manually to enter the first character of the password again, and the process is repeated.

Returning to 78, if it is determined that the correct value of the first character of the password has been successfully input, then the process continues to 83 where, based on the hint sequence in which the system decodes the next character from the hint sequence, the correct next keyboard layout is generated for display based on the hint sequence, and then the process proceeds to FIG. 3, step 86 where the next password character input is entered by and received from the user via the display having the correctly changed layout.

Then, continuing at 89, a determination is made as to whether the user has entered the last character of the user's password. If the last character has not been entered, then the process returns to step 78 to determine if the most recent (i.e., next) password character input of the password sequence has been correctly entered. Then, at 78, the system will responsively either generate a correct keyboard layout based on the sequence at 83, or generate an incorrect keyboard layout based on the sequence at 80. The process steps 78-89 repeats for each character in the sequence of characters entered until at step 89 it is determined that the last character has been input.

When, at 89, it is determined that last character of the password sequence has been entered by the user, then all of the input characters of the entered password are submitted for authentication at 90 and the process terminates.

In view of FIG. 3, functionally, after a first character is correctly entered, the stored hint is obtained, and each character entered will decode the next character of the hint sequence, and responsively switch to a next correct or incorrect keyboard display depending upon whether the password character entered is correct.

Thus, the stored hint sequence functions as a string cipher, where each character that is received is used to decrypt the next hint. If the user enters the correct character it will decrypt the hint correctly and produce the correct layout; if the user enters the wrong character, it will decrypt the hint incorrectly and the user may or may not be presented with the correct layout.

With reference now to FIG. 4, a diagram of a device, e.g., in the form of a mobile device 100, is depicted in accordance with an embodiment in which the present methods are employed.

The mobile device 100 includes a display 102 for presenting textual and graphical information and may include any known display device, such as a liquid crystal display (LCD) device. The display may be used to present any type of subject matter as known in the art. Display 102 may include a touch sensitive display surface configured to detect a touch signal indicating contact with a user (such as a finger or stylus, for example).

Mobile device 100 may also includes a virtual keypad or virtual keyboard layout 104 for display, correlating with a touch sensitive surface configured to detect a touch signal indicating contact with a user (such as a finger or stylus) and via which may be received user inputs of password characters, in the manner as described herein. Display 102 and virtual keyboard layout 104 thus form a graphical user interface that may be implemented by system software residing in computer readable media in operation within mobile device 100.

Turning now to FIG. 5, a block diagram of a mobile device system is shown in accordance with a preferred embodiment of the present invention. Mobile device 200 is an example of a mobile device, such as mobile device 100 in FIG. 4, in which code or instructions implementing the processes described herein with respect to FIGS. 2 and 3 may be located and run. Mobile device 200 includes a bus 202 to which processor 204 and main memory 206 are connected. In one embodiment, a processor or central processing unit (CPU) 204 is programmed for presenting the virtual keyboard layout of virtual keys, detecting and registering the user input, and determining whether the keyboard layout changes need to be made in the manner as described herein.

Display adapter 208, keypad adapter 210, storage 212, and audio adapter 214 also are connected to bus 202. Cradle link 216 provides a mechanism to connect mobile device 200 to a cradle used in synchronizing data in mobile device 200 with another data processing system. Further, display adapter 208 also includes a mechanism to receive user input from a stylus when a touch screen display is employed.

An operating system runs on processor 204 and is used to coordinate and provide control of various components within mobile device 200 in FIG. 5. The operating system may be, for example, a commercially available operating system such as Windows CE, which is available from Microsoft Corporation. Instructions for the operating system and applications or programs are located on storage devices, such as storage 212, and may be loaded into main memory 206 for execution by processor 204.

Figure 6:
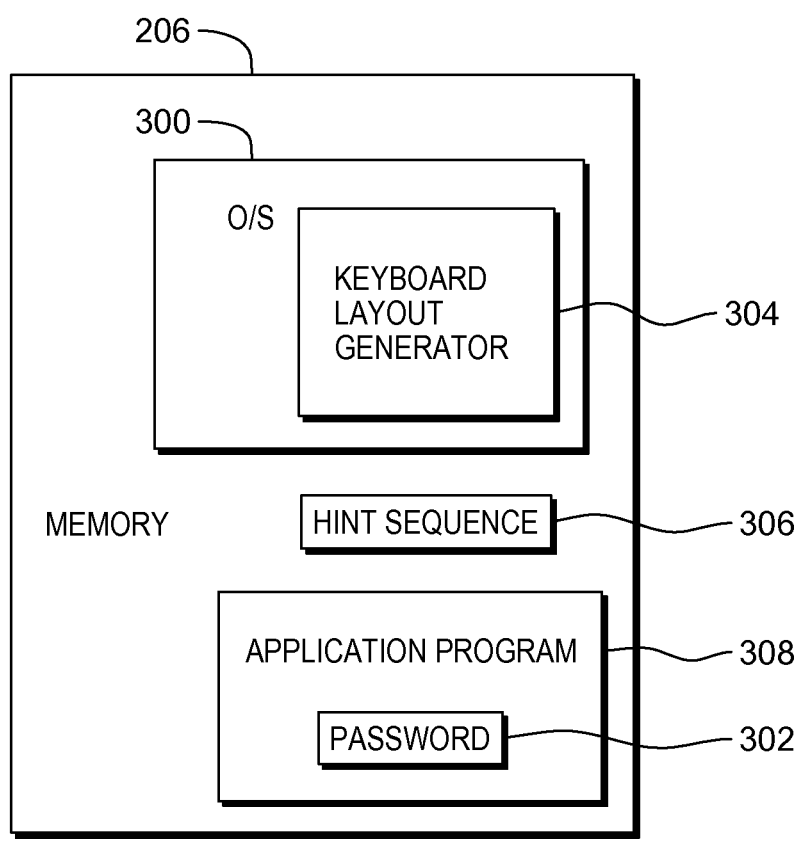
FIG. 6 depicts a memory system supporting various components for carrying out the methods described herein in one non-limiting embodiment.

That is, in one illustrated embodiment, as shown in FIG. 6, the memory 206 may include a random access memory (RAM) where the determined keyboard map layout type for each respective character in the sequence is stored.

In operation, the processor 204 is configured to detect the touch input from a user as previously described, store such input in memory 206, and determine applicable keyboard layout as previously described. As mentioned, the processing component 204 operates under control of an operating system (OS) 300 stored in the memory 206, and interfaces with the user to accept inputs and commands and to present results. In one embodiment of the present invention, the OS 300 facilitates keyboard layout configuration functionality according to the present invention. To this end, OS 300 includes a keyboard generation module 304, which may be adapted for carrying out the various processes and mechanisms described herein, e.g., storing hint sequence 306 corresponding to a user password 302 associated with an application program 308, and implementing the relationships and logic used for determining and transforming a soft keyboard layout based on user-entered password character sequence in the manner as described herein with respect to FIGS. 1-3.

Those of ordinary skill in the art will appreciate that the hardware in FIG. 4 may vary depending on the implementation. Other internal hardware (e.g., communication devices) or peripheral devices may be used in addition to or in place of the hardware depicted in FIG. 5.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the present invention has been particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

What is claimed is:

1. A method to automatically change a keyboard layout of a device while a user enters a password comprising:
    obtaining an encoded sequence of keyboard layouts mapped to a corresponding sequence of characters of a user password; and
    a) receiving input of a character of said user password;

b) determining whether said character input is correct, and
if said character entered is correct:
decoding said mapped keyboard layout sequence to
obtain a correct keyboard layout associated with a
next character to be entered for said password; and
automatically displaying said correct keyboard layout associated with a next character to be entered
on said device; or
if said character entered is not correct:
decoding said mapped keyboard layout sequence to
obtain one of: a correct or incorrect keyboard
layout associated with a next character to be
entered for said password; and
automatically displaying said correct or incorrect
keyboard layout on said device.

2. The method of claim 1, wherein said input character entered is said first character of said user password, said method further comprising:
repeating each of steps a)-b) until all successive characters of said user password are correctly entered.

3. The method of claim 2, wherein, prior to input of said first character of said user password, said user manually navigating to a correct keyboard layout associated for said first character input.

4. The method of claim 2, wherein, responsive to displaying said incorrect keyboard layout on said device, re-initiating, by the user, entry of the user password beginning from said first character.

5. The method of claim 2, wherein said encoded sequence of keyboard layouts mapped to a corresponding sequence of characters of a user password to be entered is represented as a character string.

6. The method of claim 2, further comprising:
storing said character string representation in a memory storage unit at said device in association with said user password.

7. The method of claim 6, further comprising:
encoding said sequence of keyboard layouts by:
setting a user password by inputting to said device each successive character of said user password;
analyzing a keyboard layout associated with each character input;
determining, based on the analyzing, a keyboard layout to the character input; and
mapping a keyboard layout to a corresponding character of said character string representation.

8. The method of claim 6, further comprising:
encrypting or obfuscating said stored character string representation prior to said storing.

9. A system to automatically change a keyboard layout of a device while a user enters a password comprising:
a memory storage device;
a hardware processor, coupled to the memory storage device, said processor configured to:
obtain an encoded sequence of keyboard layouts mapped to a corresponding sequence of characters of a user password; and
a) receive input of a character of said user password;
b) determine whether said character input is correct, and
if said character entered is correct:
decode said mapped keyboard layout sequence to
obtain a correct keyboard layout associated
with a next character to be entered for said
password; and
automatically display on said device said correct
keyboard layout associated with a next character to be entered; or
if said character entered is not correct:
decode said mapped keyboard layout sequence to
obtain one of: a correct or incorrect keyboard
layout associated with a next character to be
entered for said password; and
automatically display on said device said correct
or incorrect keyboard layout.

10. The system of claim 9, wherein said input character entered is said first character of said user password, said hardware processor further configured to:
repeat each of steps a)-b) until all successive characters of said user password are correctly entered.

11. The system of claim 10, wherein, responsive to displaying said incorrect keyboard layout on said device, re-initiating, by the user, entry of the user password beginning from said first character.

12. The system of claim 10, wherein said hardware processor is configured to represent, as a character string, said encoded sequence of keyboard layouts mapped to a corresponding sequence of characters of the user password.

13. The system of claim 10, wherein said hardware processor is configured to:
store said character string representation in a memory storage unit at said device in association with said user password.

14. The system of claim 13, wherein said hardware processor is configured to encode said sequence of keyboard layouts by:
setting a user password by inputting to said device each successive character of said user password;
analyzing a keyboard layout associated with each character input;
determining, based on the analyzing, a keyboard layout to the character input; and
mapping a keyboard layout to a corresponding character of said character string representation.

15. The system of claim 13, wherein said hardware processor is configured to:
encrypt or obfuscate said stored character string representation prior to said storing.

16. A computer program product for automatically changing a keyboard layout of a device while a user enters a password, the computer program product comprising a tangible storage medium readable by a processing circuit and storing instructions run by the processing circuit for performing a method, the method comprising:
obtaining an encoded sequence of keyboard layouts mapped to a corresponding sequence of characters of a user password; and
c) receiving input of a character of said user password;
d) determining whether said character input is correct, and
if said character entered is correct:
decoding said mapped keyboard layout sequence to
obtain a correct keyboard layout associated with a
next character to be entered for said password; and
automatically displaying said correct keyboard layout associated with a next character to be entered
on said device; or
if said character entered is not correct:
decoding said mapped keyboard layout sequence to
obtain one of: a correct or incorrect keyboard
layout associated with a next character to be
entered for said password; and automatically displaying said correct or incorrect keyboard layout on said device.

17. The computer program product of claim 16, wherein said input character entered is said first character of said user password, said method further comprising:
   repeating each of steps a)-b) until all successive characters of said user password are correctly entered.

18. The computer program product of claim 17, wherein said method further comprises:
   storing said character string representation in a memory storage unit at said device in association with said user password.

19. The computer program product of claim 18, wherein said method further comprises:
   encoding said sequence of keyboard layouts by:
      setting a user password by inputting to said device each successive character of said user password;
      analyzing a keyboard layout associated with each character input;
      determining, based on the analyzing, a keyboard layout to the character input; and
      mapping a keyboard layout to a corresponding character of said character string representation.

20. The computer program product of claim 18, wherein said method further comprises:
   encrypting or obfuscating said stored character string representation prior to said storing.

* * * * *